United States Patent
Croak et al.

(10) Patent No.: US 7,958,561 B1
(45) Date of Patent: Jun. 7, 2011

(54) METHOD AND APPARATUS FOR UTILIZING A CONFIGURABLE LOCK ON A DATA REPORT

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1018 days.

(21) Appl. No.: 11/092,219

(22) Filed: Mar. 29, 2005

(51) Int. Cl.
*G06F 7/04* (2006.01)

(52) U.S. Cl. .......................................... 726/27; 379/9.03

(58) Field of Classification Search .................... 726/27; 379/9.03, 9.04; 370/218, 352; 713/182
See application file for complete search history.

(56) References Cited

U.S. PATENT DOCUMENTS

| 7,047,417 B2 * | 5/2006 | Leskuski et al. | 713/182 |
| 7,225,139 B1 * | 5/2007 | Tidwell et al. | 705/8 |
| 2002/0184518 A1 * | 12/2002 | Foster et al. | 713/200 |

* cited by examiner

*Primary Examiner* — Ellen Tran

(57) ABSTRACT

A method and system for utilizing a configurable lock in a communications network is described. In one example, a key for the configurable lock on at least one data report associated with at least one customer problem is generated. The data report(s) is then subsequently locked with the configurable lock.

11 Claims, 3 Drawing Sheets

METHOD AND APPARATUS FOR UTILIZING A CONFIGURABLE LOCK ON A DATA REPORT

The present invention relates generally to communication networks and, more particularly, to a method and apparatus for utilizing a configurable lock on a data report in a communications network, e.g., a Voice over Internet Protocol (VoIP) network.

BACKGROUND OF THE INVENTION

Customers that call into care centers with complex problems will occasionally need to speak to multiple agents across multiple call sessions. However, customers will frequently express a preference to speak with a specific agent in order to maintain the continuity of a relationship established with that particular care agent.

Therefore, a need exists for a method and apparatus that aids a customer care agent to maintain established rapport with a given customer.

SUMMARY OF THE INVENTION

In one embodiment, a method and system for utilizing a configurable lock on a data report is described. More specifically, a key for a configurable lock for at least one data report associated with at least one customer problem is generated. The data report(s) is then subsequently locked with the configurable lock.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
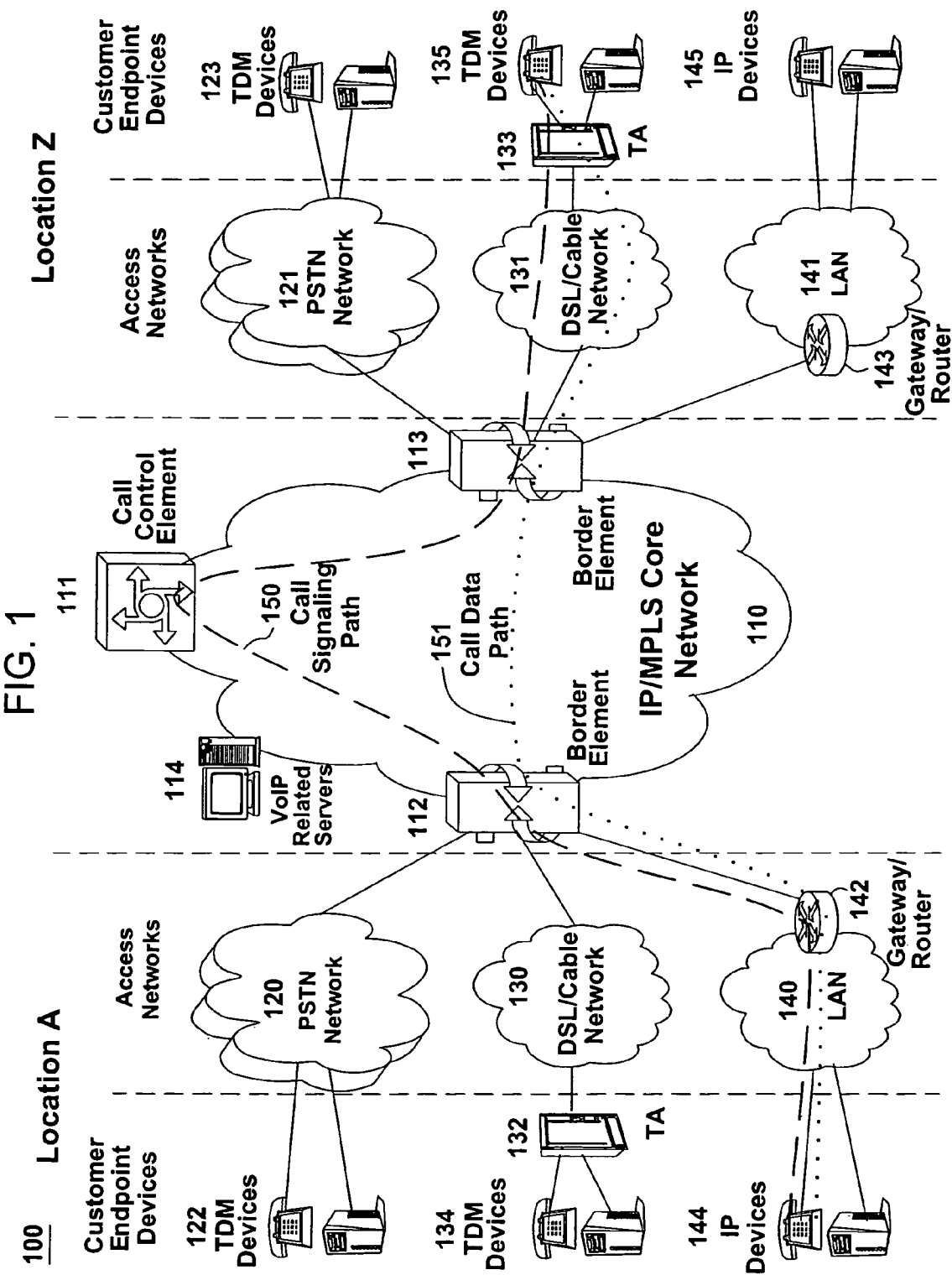
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
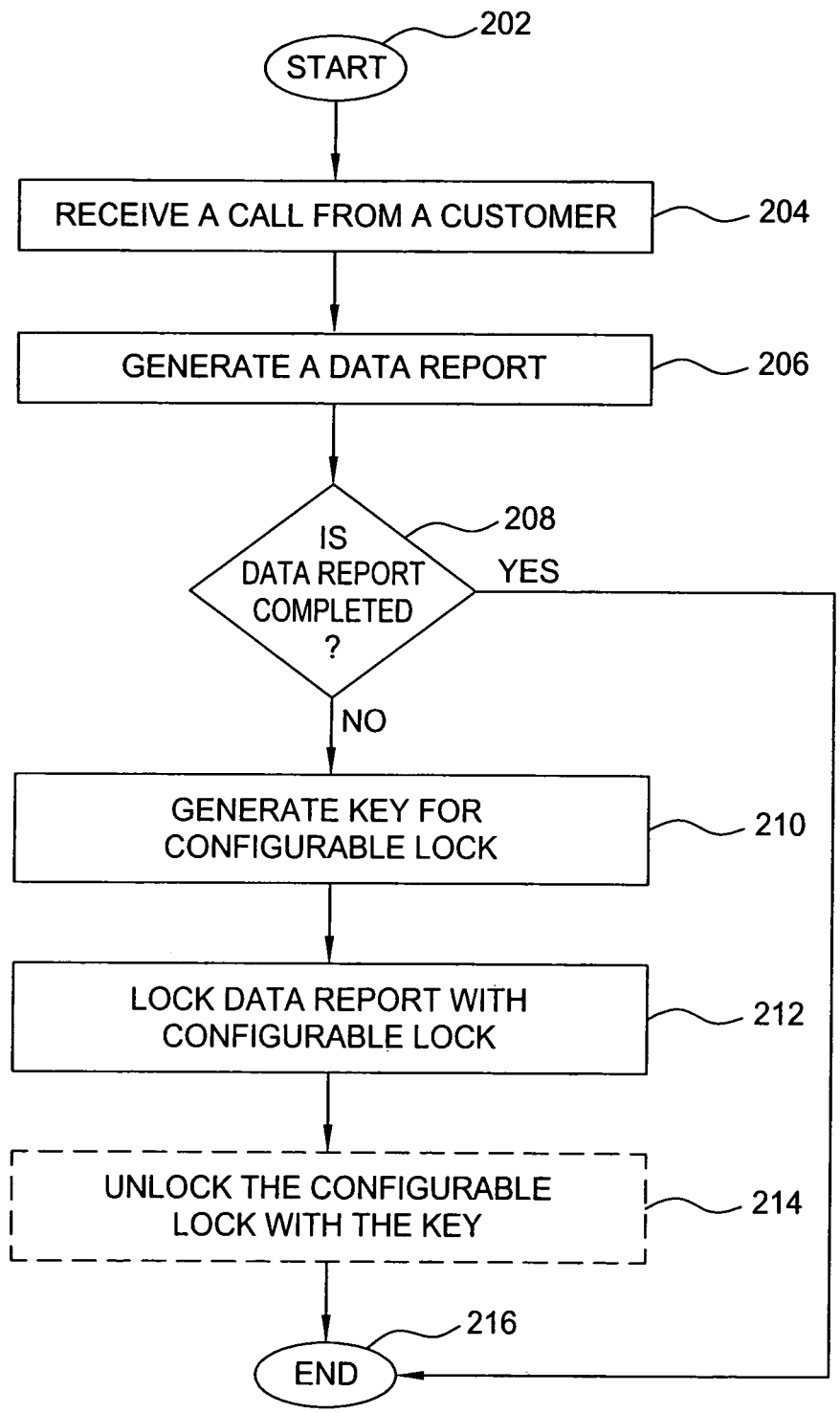
FIG. 2 illustrates a flowchart of a method for utilizing a configurable lock on a data report of the present invention.

FIG. 2 is a flow diagram depicting an exemplary embodiment of a method 200 for utilizing a configurable lock on a data report in accordance with the present invention. Aspects of the method 200 may be understood with reference to the communications system 100 of FIG. 1. The method 200 begins at step 202. At step 204, communication with at least one customer is established. In one embodiment, the customer may call a customer care center (or other type of call center) in order to report a problem or difficulty encountered with some aspect of the communications system 100. Typically, the customer call is received by a customer care agent located at the customer care center.

At step 206, a data report is generated. In one embodiment, a plurality of data reports is generated by customer care agents at a customer care center. In another embodiment, the data reports may be trouble tickets, which comprise electronic forms that include descriptions of various problems being encountered by calling customers. More specifically, the description of a caller's reported problem, along with other relevant data (e.g., customer name, address, phone number, account number, etc.), is logged into a trouble ticket by a customer care agent. If applicable, the trouble ticket is subsequently prepared to be submitted to a trouble ticketing center or server (e.g., a VoIP related server) 114. The trouble ticketing center comprises at least one trouble ticketing server that is responsible for collecting and processing trouble tickets.

At step 208, a determination of whether the data report is completed is made. If the data report is completed, the method 200 proceeds to step 216 and ends. In one embodiment, the trouble ticket is completed by the customer care agent and is submitted to the trouble ticketing server 114. Alternatively, if the trouble ticket has not been completed (e.g., fully entered), the method 200 continues to step 210. There may be several scenarios in which the trouble ticket has not been entered and submitted to the trouble ticket center or server 114. In one exemplary embodiment, a calling customer needs to end the call to the customer care agent prematurely for any number of reasons. Since the caller has established a rapport with a particular customer care agent, the caller may request that this agent handle the trouble ticket in the event the caller calls back and resumes the trouble ticket "session." In another embodiment, the trouble ticket may not be completed because the customer care agent needs to end the call prematurely, e.g., to consult with an expert, review records and files, and the like. Regardless of the reason, the method 200 continues to step 210 if the trouble ticket is not completed or immediately submitted.

At step 210, a key for a configurable lock is generated. In one embodiment, a configurable lock is a software-based mechanism that allows a customer care agent to lock a customer trouble ticket to prevent other customer care agents from returning the customer's call or to "close out" the trouble ticket. This would allow the original customer care agent to act as the sole contact for the customer. This is desirable in many scenarios and promotes customer satisfaction. The primary lock is configurable because it may utilize sub-locks (see below). In addition, the configurable lock permits a customer care manager (or another customer care agent) to access the locked trouble ticket in an emergency situation or per a customer's request. The configurable lock typically requires a key for security reasons.

In one embodiment, the key may comprise a login password, an access code, and the like. The key may be generated by the dedicated trouble ticket server 114. In one embodiment, the key may be predefined by the customer care agent. Similarly, the key may comprise the combination of the agent's identification number and a selected alphanumeric code. In another embodiment, the key may be composed of a combination of elements, such as the trouble ticket number, the customer agent identification number, customer's account number (or portion thereof), and the like. Lastly, the key may be generated by a random process.

At step 212, the data report is locked with a configurable lock. In one embodiment, the customer care agent enables a configurable lock on the trouble ticket. Depending on the embodiment, the configurable lock may or may not necessarily require the key to lock. Typically, the configurable lock is utilized in situations where a trouble ticket cannot be completed and the calling customer (or the customer care agent) wants the current customer care agent to handle the problem the next time the customer calls. By placing the configurable lock on a trouble ticket, the customer care agent effectively removes the trouble ticket from the normal queue of trouble tickets to be processed. Alternatively, the agent may place the trouble ticket in the normal queue to be processed with the configurable lock enabled. By utilizing this feature in this manner, the problem detailed in the trouble ticket may be addressed by a technician, engineering operations team, or the like. However, the trouble ticket cannot be "closed" without the agent removing the configurable lock. Therefore, this feature allows a single customer care agent to work directly with the customer as well as verifying the final disposition of the trouble ticket, thus attaining a higher level of customer satisfaction.

At step 214, the configurable lock is removed with the key. In one embodiment, the customer care agent unlocks a trouble ticket using the previously generated key. By doing so, the care agent unlocks the trouble ticket to resume working on the incomplete trouble ticket. The configurable lock is also ultimately removed by the customer care agent in order to "close out" the ticket. In another embodiment, the trouble ticket is unlocked so it may be placed in the processing queue (like any other conventional trouble ticket) in order to obtain a resolution of the calling customer's problem. In one embodiment, the trouble ticket will then be forwarded to an engineering operations team who will attempt to repair or resolve the problem. In another embodiment, a customer care manager or even another customer care agent may be able to "override" the configurable lock and access the trouble ticket in situations that require immediate attention due to an emergency or per the customer's request. For example, the customer care manager may possess a key that is capable of accessing any trouble ticket secured by a configurable lock. The method 200 continues to step 216 and ends.

In one embodiment, the present invention may also incorporate the use of "sub-locks." Notably, a customer care agent (e.g., the primary lock holder) may set a configurable lock to operate in a fashion that enables multiple identifiable agents to use sub-locks to resolve the customer complaint. These sub-locks may be utilized, for example, to allow an engineering operations team to repair the customer problem (or particular aspects of the problem) and input relevant data into the trouble ticket. This process is conducted in a manner that is transparent to the customer and effectively allows an operations team to work on an unresolved customer problem while the trouble ticket is still locked by the primary configurable lock. Notably, the sub-locks function in the same fashion as the configurable lock described above.

For example, consider a particular configurable lock that comprises of two sub-locks. The two sub-locks may be related to a software problem and a hardware problem (i.e., these two problems are two aspects represented in the primary trouble ticket). A software engineer tasked with resolving the software aspect of the trouble ticket is afforded the ability to work or access the portion of the trouble ticket relating to the software problem in a transparent fashion by utilizing a sub-lock. The software engineer may open or close the sub-lock without any regard to any other aspect of the trouble ticket (e.g., a hardware problem corresponding to another sub-lock). Depending on the embodiment, the agent responsible for the primary configurable lock may or may not be able to "close out" the trouble ticket with outstanding (e.g., locked) sub-locks. In another embodiment, these sub-locks may also be used by a second customer care agent to resolve the customer's unsettled problem in the event the original customer care agent is absent when the customer calls back for a second (or subsequent) time.

Figure 3:
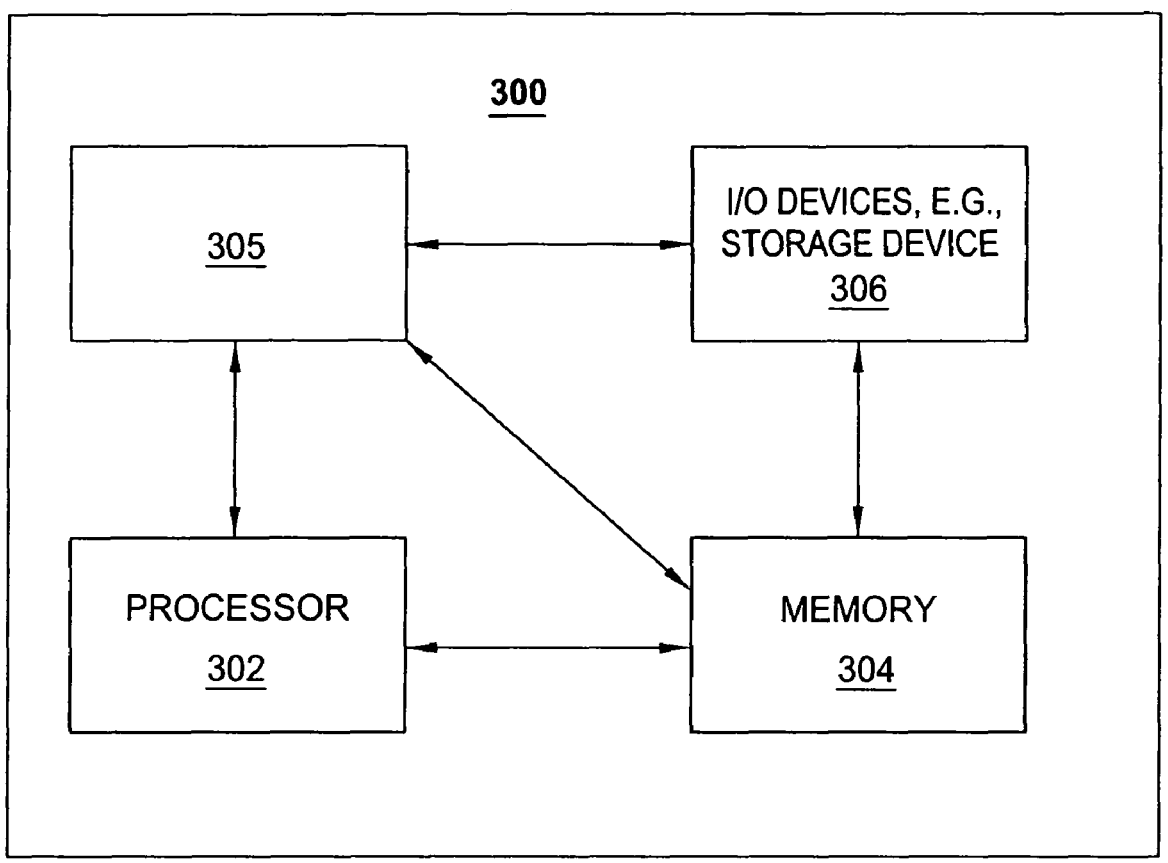
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a configurable locking module 305, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present configurable locking module or process 305 can be loaded into memory 304 and executed by processor 302 to implement the functions as discussed above. As such, the present configurable locking process 305 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for utilizing a configurable lock in a communications network, comprising:
   generating a key for the configurable lock on a data report associated with a customer problem;
   locking the data report with the configurable lock by a customer care agent, wherein the customer care agent comprises a human agent, wherein the data report comprises a trouble ticket, wherein the trouble ticket comprises an electronic form including a description of the customer problem encountered by a customer, and wherein the trouble ticket will not be completed without removal of the configurable lock by the customer care agent; and
   unlocking by the customer care agent the configurable lock with the key upon a resolution of the customer problem.

2. The method of claim 1, wherein the communications network is an internet protocol network.

3. The method of claim 1, wherein the key comprises a login password and an access code.

4. The method of claim 1, wherein the key includes a customer care agent identification number.

5. The method of claim 1, wherein the data report comprises a sub-lock that controls access to a portion of the data report.

6. A system for utilizing a configurable lock in a communications network, comprising:
   a processor configured to:
       generate a key for the configurable lock on a data report associated with a customer problem;
       enable locking the data report with the configurable lock by a customer care agent, wherein the customer care agent comprises a human agent, wherein the data report comprises a trouble ticket, wherein the trouble ticket comprises an electronic form including a description of the customer problem encountered by a customer, and wherein the trouble ticket will not be completed without removal of the configurable lock by the customer care agent; and
       enable unlocking by the customer care agent the configurable lock with the key upon a resolution of the customer problem.

7. The system of claim 6, wherein the key comprises a login password and an access code.

8. The system of claim 6, wherein the data report comprises a sub-lock that controls access to a portion of the data report.

9. A non-transitory computer readable medium having stored thereon instructions that, when executed by a processor, cause the processor to perform a method for utilizing a configurable lock in a communications network, comprising:

generating a key for the configurable lock on a data report associated with a customer problem;

locking the data report with the configurable lock by a customer care agent, wherein the customer care agent comprises a human agent, wherein the data report comprises a trouble ticket, wherein the trouble ticket comprises an electronic form including a description of the customer problem encountered by a customer, and wherein the trouble ticket will not be completed without removal of the configurable lock by the customer care agent; and unlocking by the customer care agent the configurable lock with the key upon a resolution of the customer problem.

10. The non-transitory computer readable medium of claim 9, wherein the key comprises a login password and an access code.

11. The non-transitory computer readable medium of claim 9, wherein the data report comprises a sub-lock that controls access to a portion of the data report.

* * * * *